(12) United States Patent
Agarwala et al.

(10) Patent No.: US 8,401,835 B2
(45) Date of Patent: Mar. 19, 2013

(54) TRIGGER ORDERING FOR TRACE STREAMS WHEN MULTIPLE TRIGGERS ACCUMULATE

(75) Inventors: Manisha Agarwala, Richardson, TX (US); John M. Johnsen, Dallas, TX (US); Lewis Nardini, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2128 days.

(21) Appl. No.: 10/302,083

(22) Filed: Nov. 22, 2002

(65) Prior Publication Data

US 2004/0102953 A1 May 27, 2004

(51) Int. Cl.
*G06F 9/455* (2006.01)
*G06F 11/00* (2006.01)
(52) U.S. Cl. .................................. 703/24; 714/45
(58) Field of Classification Search .............. 703/24; 709/224, 200; 714/25, 29, 45
See application file for complete search history.

(56) References Cited

U.S. PATENT DOCUMENTS 5,968,188 A * 10/1999 Rana ..................... 714/29
6,763,385 B1 * 7/2004 Orfali .................... 709/224

OTHER PUBLICATIONS

UnixHelp.ed.ac.ul, "UNIX man pages: klogd (8)", 1994.*
ARM Limited, "Trace Debug Tools" Version 1.2 User Guide, (ARM DUI 0118C) 2000-2002.*
IBM, "Contents "TPF System Macros" IBM Library Server", 2000.*
ARM Limited, "ARM Agilent Debug Interface" Version 1.0 User Guide, (ARM DUI 0158A) 2001.*

* cited by examiner

*Primary Examiner* — David Silver
(74) *Attorney, Agent, or Firm* — Robert D. Marshall, Jr.; Wade James Brady, III; Frederick J. Telecky, Jr.

(57) ABSTRACT

In the case of tracing processor activity and generating data streams multiple triggers can be generated at the same time. The issue is further complicated in a protected pipeline where certain locations are considered as in illegal instruction boundary. During those cycles certain information is invalid and cannot be transmitted to the user. Thus a received trace trigger cannot begin. This invention resolves all ambiguities related to multiple triggers so that the user has a known predictable behavior based on the setup of the triggers.

1 Claim, 5 Drawing Sheets

For multiple cycle

Start Trigger

End Trigger

Trace

Branch Delays for Branches and Exceptions

Simultaneous Triggers in Branch Delay when Tracing OFF

For a single cycle

Simultaneous Triggers in Branch Delay when Tracing ON

For a single cycle

TRIGGER ORDERING FOR TRACE STREAMS WHEN MULTIPLE TRIGGERS ACCUMULATE

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates a prior art emulator system including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 110 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

In the case of tracing processor activity and generating data streams multiple triggers can be generated at the same time. The issue is further complicated in a protected pipeline where certain locations are considered as in illegal instruction boundary. During those cycles certain information is invalid and cannot be transmitted to the user. Thus a received trace trigger cannot begin.

This invention resolves all ambiguities related to multiple triggers so that the user has a known predictable behavior based on the setup of the triggers.

BRIEF DESCRIPTION OF THE DRAWINGS

These and other aspects of this invention are illustrated in the drawings, in which:

FIG. 6 is a timing diagram illustrating the results of receiving a start trigger and an end trigger during the same cycle when tracing is initially ON;

FIG. 7 is a timing diagram illustrating the results of receiving both a start trigger and an end trigger during multiple cycles when tracing is initially ON;

FIGS. 10A, 10B, 10C and 10D are timing diagrams which together illustrate the results of receiving a trigger at the branch destination when tracing is initially ON.

DETAILED DESCRIPTION OF PREFERRED EMBODIMENTS

Figure 1:
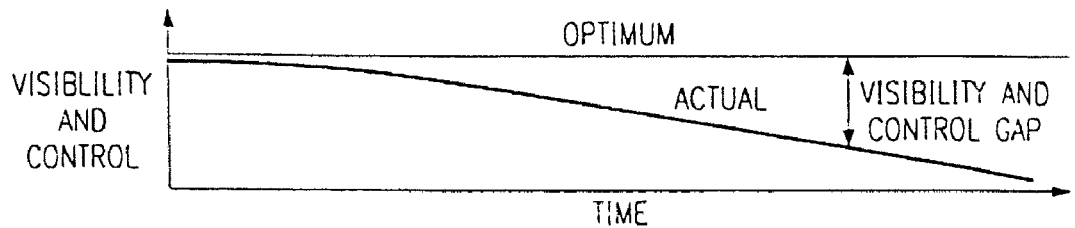
FIG. 1 illustrates the visibility and control of typical integrated circuits as a function of time due to increasing system integration.
Figure 2:
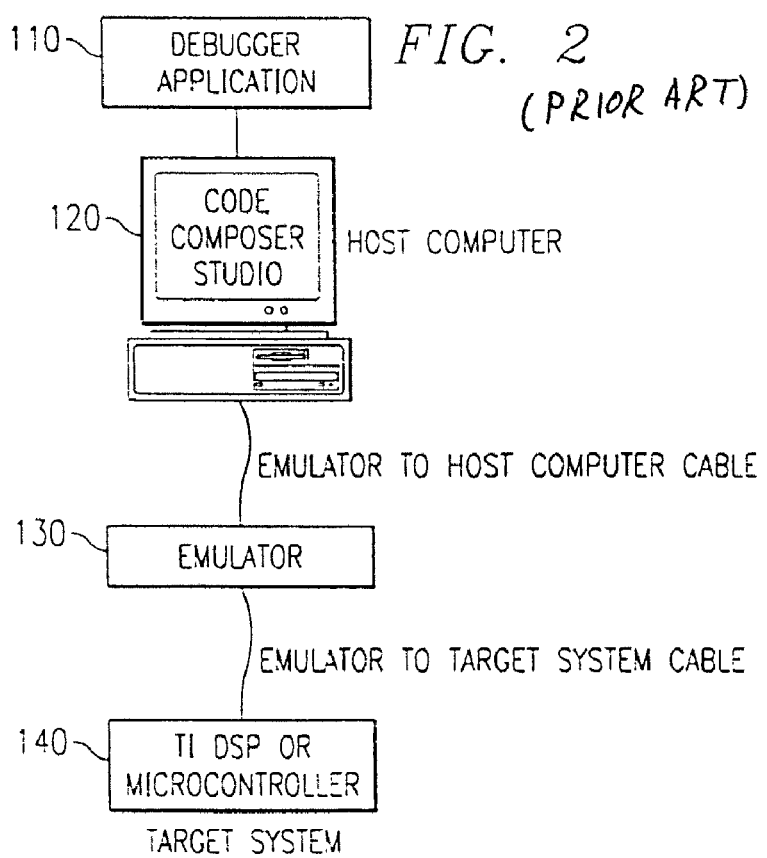
FIG. 2 illustrates an emulation system to which this invention is applicable (prior art)
Figure 3:
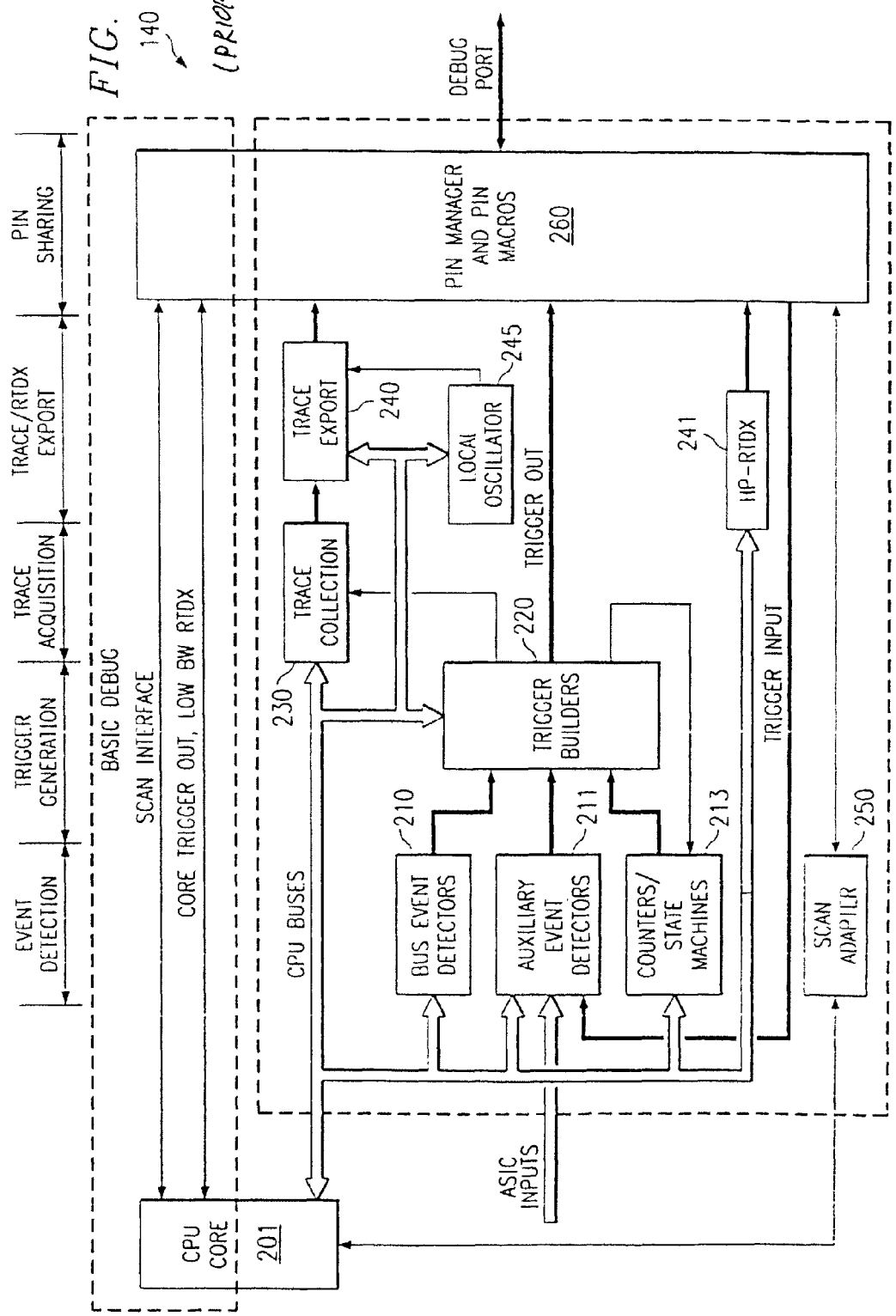
FIG. 3 illustrates in block diagram form a typical integrated circuit employing configurable emulation capability (prior art)

FIG. 3 illustrates an example of a prior art one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Various trace data streams are synchronized using markers called sync points. The sync points provide a unique identifier field and a context to the data that will follow it. All trace data streams may generate a sync point with this unique identifier. The information in the sync point is valid only at a legal instruction boundary. As an example, the sync points can be generated due to one or more of the following reasons: starting a timing stream trace; starting a program counter stream trace; ending a timing stream trace; ending a program counter stream trace; specifically marking a location in the stream; expiration of periodic counters; and a TEND directive which turns off all traced data streams immediately.

In the preferred embodiment, start triggers have the effect in the same cycle. End triggers do not stop tracing in the same cycle. Instead they trace that cycle and turn off tracing in the next cycle. In normal program flow the only problem that can exist is if multiple triggers occur in the same cycle. There are multiple solutions possible for each of those cases.

Figure 4:
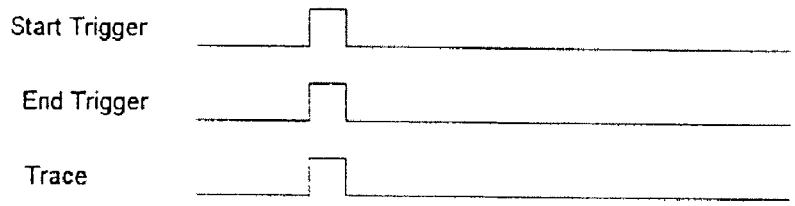
FIG. 4 is a timing diagram illustrating the results of receiving a start trigger and an end trigger during the same cycle when tracing is initially OFF.
Figure 5:
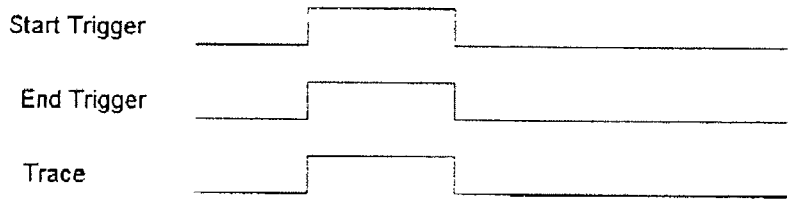
FIG. 5 is a timing diagram illustrating the results of receiving both a start trigger and an end trigger during multiple cycles when tracing is initially OFF.

Consider the case of multiple triggers in the timing stream in the same cycle. Table 1 shows multiple trigger handling according to this invention. A BLIP entry implies tracing for a single cycle only. This is illustrated in FIGS. 4 and 5. If there are multiple entries in the Impact column, then multiple solutions are possible for those trigger combinations. The benefits of each case will be explained later.

TABLE 1

| Current Stream State | Start Trigger | End Trigger | Impact of Trigger(s) |
|---|---|---|---|
| Stream OFF | 1 | 0 | Turn ON Stream |
|  | 0 | 1 | No Effect |
|  | 1 | 1 | Ignore End |
|  |  |  | Ignore Both Triggers |
|  |  |  | BLIP |
| Stream On | 1 | 0 | No Effect |
|  | 0 | 1 | Turn OFF Stream |
|  | 1 | 1 | Ignore Both Triggers |
|  |  |  | Turn OFF Stream |

Whether the trace stream is currently on or off, the most problematic case is when both the start and the end triggers occur simultaneously. Suppose the timing stream is off when both triggers occur. For an Ignore End response, since the user has specifically set up the end trigger the user would have no idea why his stream did not stop getting traced. For an Ignore both triggers response, since the user has specifically set up the start trigger it would be incorrect to ignore the start trigger. A Blip response may be the best response. In this case the start marker identifies the start of tracing, and an immediate end marker will mark the end of the trace. Therefore the user knows exactly what happened. If it was incorrect programming on his part he can go ahead and change it. If it was intentional, then the user is being provided the exact information requested by him.

FIGS. 4 and 5 illustrate the preferred Blip response in these cases. In FIG. 4 a start trigger and an end trigger are received during the same single cycle. The trace initially turned OFF, turns ON and then OFF following that single cycle. In FIG. 5 a start trigger and an end trigger are both received for multiple cycles. The trace stream initially turned OFF, turns ON at the beginning of the multiple cycles and then turns OFF at the end of the multiple cycles.

Suppose the timing stream was on when both the triggers occur. For an Ignore Both Triggers response the user will again have no knowledge of why his stream is not turning off. For a Turn Off the stream response, since the trace data stream is on, there is no point in sending a start marker. However the end marker will inform the user that the end trigger has occurred. The same reasoning is true for tracing of other streams.

Figure 6:
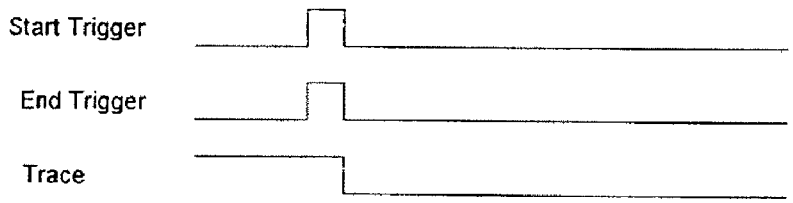
Figure 7:
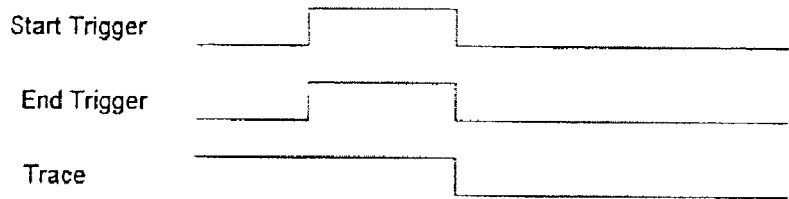

FIGS. 6 and 7 illustrate the preferred Turn OFF Stream response. In FIG. 6 both a start trigger and an end trigger are received during a single cycle. The trace stream initially turned ON, turns OFF following the single cycle. In FIG. 7 a start trigger and an end trigger are both received for multiple cycles. The trace stream initially turned ON, turns OFF at the end of the multiple cycles.

Extending this concept to protected pipelines, there are some more interesting cases that can exist. In the case of unprotected pipelines, there are certain boundaries that are considered illegal as far as switching trace streams is concerned. These boundaries include: branch delay slots; multi-cycle no operation instructions (NOPs); and exception latency cycles. If a trigger occurs during the latency slots of these cases, the trigger effect is held until reaching the destination of the event. Furthermore there could be more triggers occurring at the destination of the event.

Figure 8:
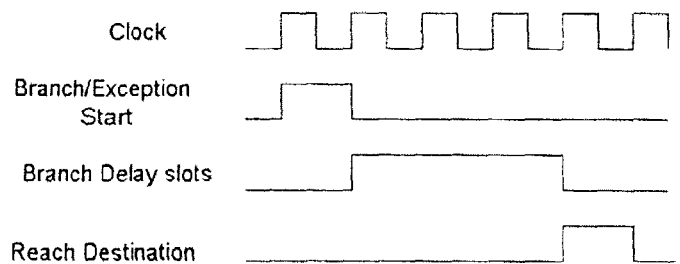
FIG. 8 is a timing diagram illustrating a branch delay slot with a trace trigger at the destination.

FIG. 8 illustrates the timing of these events. The clock signal measures time in the data processor. A branch/exception start signal marks an interruption in linear program flow. In a pipelined processor one or more clock cycles pass before the program flow reaches the destination of the branch or exception. This takes into account program instructions already in the pipeline and the necessity for the branch or exception instruction to propagate through the pipeline. The program flow reaches the branch or exception destination following these branch delay slots.

Table 2 shows the preferred responses in these cases.

TABLE 2

| Current State | Trigger in delay slots | Trigger at destination | Sync points |
|---|---|---|---|
| Stream On | Start/End | None | End |
| Stream Off | Start/End | None | Blip |
| Stream On | End/Start | None | End |
| Stream Off | End/Start | None | Blip |
| Stream On | End | None | End |
| Stream Off | End | None | No Change |
| Stream On | Start | None | No Change |
| Stream Off | Start | None | Start |
| Stream On | Start/End | Start | No Change |
| Stream Off | Start/End | Start | Start |
| Stream On | End/Start | Start | No Change |
| Stream Off | End/Start | Start | Start |
| Stream On | End | Start | No Change |
| Stream Off | End | Start | Start |
| Stream On | Start | Start | No Change |
| Stream Off | Start | Start | Start |
| Stream On | Start/End | End | End |
| Stream Off | Start/End | End | Blip |
| Stream On | End/Start | End | End |
| Stream Off | End/Start | End | Blip |
| Stream On | End | End | End |
| Stream Off | End | End | No Change |
| Stream On | Start | End | End |
| Stream Off | Start | End | Blip |

Any trigger at the destination cancels any pending triggers. However, an end trigger at the destination becomes effective a cycle later. Therefore a pending start trigger will cause the tracing to happen for one cycle and the end trigger will stop the tracing in the following cycle.

Figure 9A:
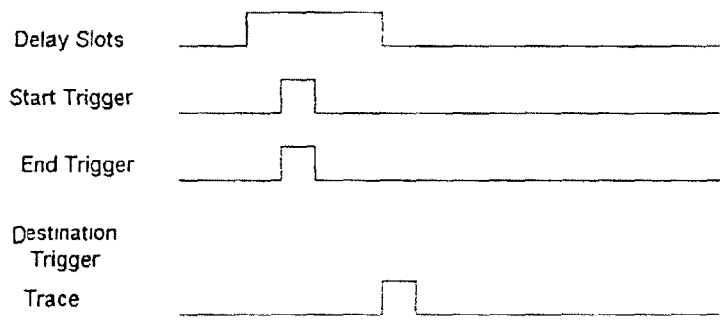
FIGS. 9A, 9B, 9C and 9D are timing diagrams which together illustrate the results of receiving a trigger at the branch destination when tracing is initially OFF.
Figure 9B:
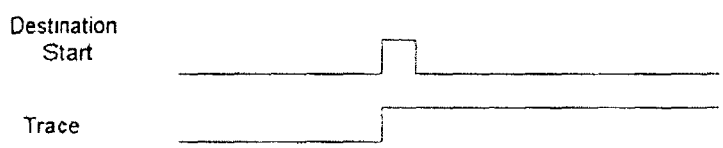
Figure 9C:
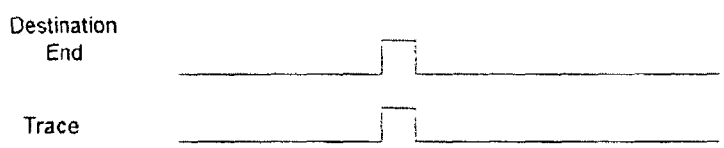
Figure 9D:

FIGS. 9A, 9B, 9C and 9D illustrate the timing of the resolution of conflicting signals for the case where tracing is initially OFF. FIG. 9A illustrates the timing of the various signals. Both a start trigger and an end trigger are received during the delay slot. The destination trace signal is received in the next cycle following the delay slot. FIG. 9B illustrates that if the destination trigger is a start trigger, then tracing is turned ON regardless of the signals received during the delay slot. FIG. 9C illustrates that if the destination trigger is an end trigger, then there is a tracing Blip for the next cycle. FIG. 9D illustrates that if there is both a start trigger and an end trigger at the destination, then there is a tracing Blip for the next cycle.

Figure 10A:
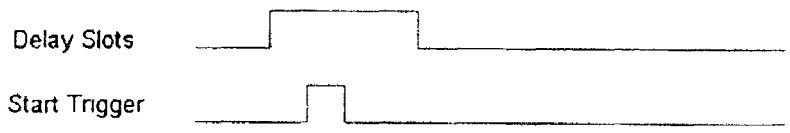
Figure 10B:
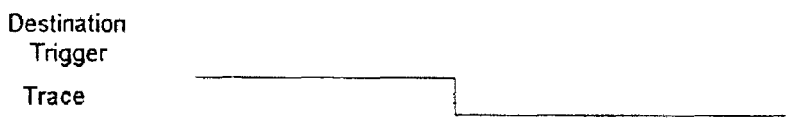
Figure 10C:
Figure 10D:
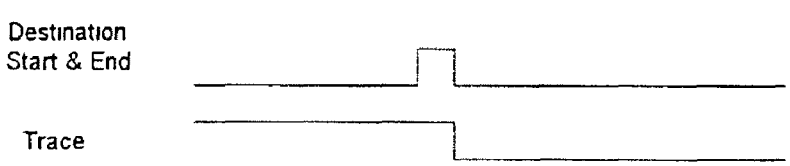

FIGS. 10A, 10B, 10C and 10D illustrate the timing of the resolution of conflicting signals for the case where tracing is initially ON. FIG. 10A illustrates the timing of the various signals. Both a start trigger and an end trigger are received during the delay slot. The destination trace signal is received in the next cycle following the delay slot. FIG. 10B illustrates that if the destination trigger is a start trigger, then tracing is unchanged and remains ON regardless of the signals received during the delay slot. FIG. 10C illustrates that if the destination trigger is an end trigger, then tracing is turned OFF. FIG. 10D illustrates that if there is both a start trigger and an end trigger at the destination, then tracing is turned OFF.

What is claimed is:

1. A method of tracing data processor operation comprising the steps of:
    upon receipt of a trace start trigger and a trace end trigger during delay slot cycles of a branch instruction
        if trace collection is OFF and no trace trigger occurs at the branch destination, turning trace collection ON for the duration of said delay slot and thereafter turning trace collection OFF, and
        if trace collection is ON and no trace trigger occurs at the branch destination, turning trace collection OFF after said delay slot,
    if a trace start trigger occurs at the branch destination, turning trace collection ON at the branch destination or continuing trace collection ON,
    if trace collection is OFF and a trace end trigger occurs at the branch destination, turning trace collection ON for the duration of the branch destination instruction and then turning trace collection OFF, and
    if trace collection is ON and a trace end trigger occurs at the branch destination, turning trace collection OFF after the branch destination instruction.

* * * * *